United States Patent Office 2,957,354
Patented Oct. 25, 1960

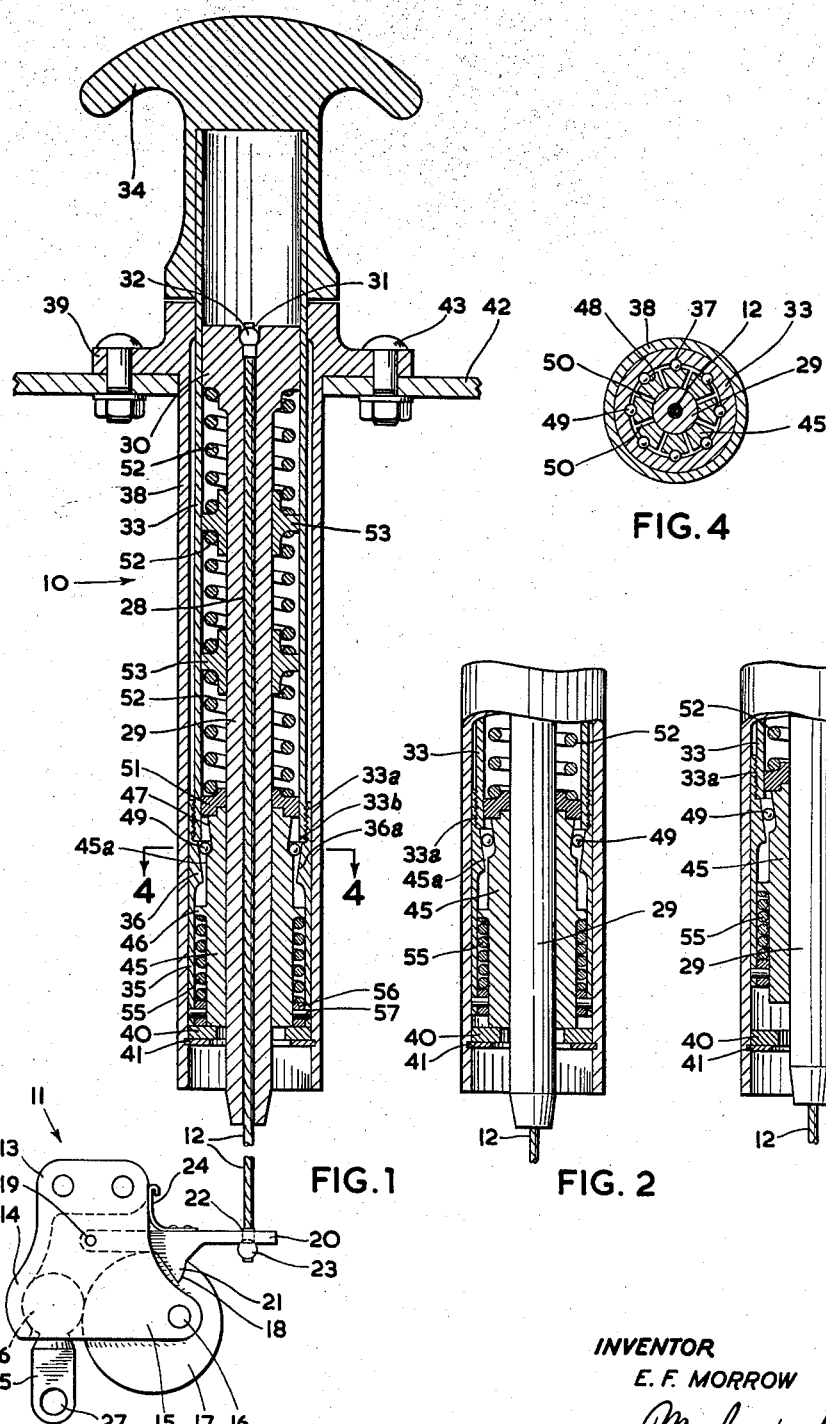

2,957,354

MECHANICAL ACTUATING DEVICE

Elmore Frank Morrow, Montreal, Quebec, Canada, assignor to Avro Aircraft Limited, Ontario, Canada, a corporation Filed Feb. 21, 1958, Ser. No. 716,670

6 Claims. (Cl. 74—502)

This invention relates to a mechanical actuating device, particularly to one which includes means for controlling the tension of a control cable.

An important use of the device is in para-brake release units. The high landing speeds of modern aircraft have resulted in the overloading of the wheel brakes and the resultant use of supplementary braking devices. The most efficient of these supplementary braking devices is a parachute streaming from the rear fuselage of the aircraft, a parachute of this type usually being called a para-brake.

Once a para-brake has served its purpose, it is necessary to quickly dispose of it so that it does not become a hindrance to the ground handling of the aircraft, a quick release mechanism which is operable by the pilot usually being provided for the jettisoning of the para-brake.

One object of this invention is to provide an actuating device which will not operate accidentally as a result of large temperature differentials or strains caused by flexure of the structure in which the actuating device is mounted.

Another object is to provide an actuating device through which a control cable can be pulled, but capable of maintaining a desired tension in the cable and thus preventing false operation when the cable is subjected to temperature variations or to forces that are not applied to it by operation of the actuating device.

Other objects of the invention will appear from the following specification when read in conjunction with the accompanying drawings which show a preferred embodiment of the invention and in which like reference characters refer to like parts. In the drawings:

Fig. 1 is a longitudinal sectional view of the actuating device coupled to a schematically illustrated quick release mechanism;

Fig. 2 is a view similar to Fig. 1 showing a portion of the actuating device prior to the release of the quick release mechanism;

Fig. 3 is a view similar to Fig. 1 showing a portion of the actuating device during the release of the quick release mechanism;

Fig. 4 is a cross sectional view of the actuating device taken along the line IV—IV of Fig. 1.

The drawings show an actuating device 10 which operates a quick release mechanism 11 by pulling a cable 12.

The quick release mechanism 11 is illustrated only schematically because the internal details of its construction do not form part of the invention. If further details about suitable para-brake release mechanisms are required, U.S. Patent 2,870,510 issued January 27, 1959, to Avro Aircraft Limited may be referred to. The quick release mechanism 11 consists of a body 13 having a curved arm 14 and parallel side plates 15 between which there is an axle 16 that provides a pivot for an eccentric 17 having a generally triangular recess 18. A second axle 19 between the plates 15 provides a pivot for an arm 20 having a prong 21 that is adapted to fit into the generally triangular recess 18. The arm 20 also has a bore 22 through one end, the cable 12 being held in the bore 22 by a nipple 23 which is swaged onto the end of the cable 12. The arm 20 is biased against the pull of the cable 12 by a spring 24. A clevis 25 has a ball end 26 which is adapted to be received and held against the curved arm 14 by the eccentric 17. The clevis has a pin 27 to which a parachute (not shown) may be attached. Pulling the cable 12 causes the arm 20, to which the cable is connected, to pivot about the axle 19 removing the prong 21 from the recess 18 of the eccentric 17 and leaving the eccentric 17 free to pivot about the axle 16. Thus the ball end 26 of the clevis 25 is no longer held against the pull of the parachute by the arm 14 and the eccentric 17.

The other end of the cable 12 passes through a longitudinal bore 28 of a cylinder 29 having an annular flange 30 at one end. The bore 28 has a recess 31 at one of its ends, the recess 31 housing a nipple 32 which is swaged onto the end of the cable 12 so that, as will be seen, the cable and cylinder 29 together constitute a member that can be pulled to pivot the arm 20 against the force of the spring 24.

The cylinder 29 is free to slide in a cylinder 33 having a T-handle 34 at one end and having its other end threaded as at 33a to receive a threaded cylindrical extension 35. The extension 35 has an annular rib 36 having a frusto-conical camming surface 36a that tapers towards the axis of the cylinder 33 as the distance from the T-handle 34 increases. The rib 36 has eight grooves 37 (Fig. 4) which extend longitudinally of the surface 36a and which are equiangularly disposed about its axis. The cylinder 33 and the cylindrical extension 35 constitute a tubular actuator, the operation of which will presently appear.

The cylinder 33 and the cylindrical extension 35 are free to slide in a supporting tube 38 having at one end an external mounting flange 39 and at the other end an internal abutment ring 40 which is retained in position by a circlip 41. The flange 39 is attached to a control panel 42 by bolts 43.

Free to slide within the cylindrical extension 35 is a body 45 consisting of a deformable collet having an annular guide flange 46 fitting within the extension 35. The collet 45 is provided with an outer frusto-conical camming surface 47 that is tapered outwardly from the axis of the cylindrical extension 35 so as to be parallel to the tapered surface 36a of the annular rib 36. A suitable taper ratio is 20:1. The surface 47 is provided with eight longitudinal grooves 48 located opposite the grooves 37 in the annular rib 36. A ball 49 is provided for each pair of the opposed grooves 37 and 48 and each ball is prevented from moving out of the grooves by the lower edge 33b of the cylinder 33 and by a lip 45a of the collet 45. The collet 45 has longitudinal splits 50 midway between the grooves 48 extending for approximately five-sixths of the total length of the collet, forming an eight jawed chuck about the cylinder 29.

An end cap 51, which is slidable in the cylinder 33, is spigotted onto the end of the collet 45 to form a seat for a series of three coil springs 52 that are separated by guide collars 53. The guide collars 53 are slidable on the cylinder 29 and within the cylinder 33. Another coil spring 55 is located between the guide flange 46 of the collet 45 and a collar 56 which is pinned to the end of the cylindrical extension 35 by four roll pins 57.

In the position illustrated in Fig. 1, the compressive force in the springs 52 exceeds the compressive force in the spring 55 so that the resultant force on the collet 45 due to the springs 52 and 55 holds the collet 45 against the abutment ring 40. With the cylindrical extension 35 resting against the abutment ring 40 the balls 49 rest against the lip 45a of the collet 45 at one end of the grooves 48, and with the balls 49 in this position the jaws of the collet 45 do not grip the cylinder 29. The cylinder 29 is urged in the direction of the handle 34 by the springs 52 and the cable 12 is therefore in tension. Any expansion or contraction of the cable 12, and any strains due to flexure of the aircraft or other structure in which the actuating device 10 is mounted, are taken up by the springs 52 so that the quick release mechanism 11 is not released. The springs 52, 55 thus constitute means for positioning the actuator 33, 35 and body 45 against the abutment ring 40 and for maintaining desired tension in the cable 12 in this inactive position of the gripping device.

If the T-handle 34 is pulled away from the panel 42, the actuator formed by the member 33 and its extension 35 is pulled away from the abutment ring 40, and the balls 49 are forced to move along the grooves 37 and 48 from the position shown in Fig. 1 to positions shown consecutively in Figs. 2 and 3. Although the actuator moves away from the abutment ring 40, the collet 45 remains held against the abutment ring 40 under the force of the springs 52, despite the fact that the spring 55 is being compressed. However, the movement of the balls 49 along the grooves forces the jaws of the collet 45 to constrict about the cylinder 29 and grip it firmly, and once this occurs further movement of the balls along the grooves is prevented and the collet and the cylinder 29 move in the direction of handle motion, pulling the cable 12 with them. It will thus be seen that the jaws of the collet 45 are deflected into engagement with the cylinder 29 by a camming or wedging action of the balls 49 against the grooves 37, the grooves 37 in the extension 35, the balls 49 and the grooves 48 thus constituting camming or wedging means which force the body 45 and member 29, 12 to move with the actuator 33, 35. Movement of the cable 12 causes the arm 20 of the quick release mechanism to pivot about the axle 19 against the bias of the spring 24 thereby releasing the quick release mechanism 11 as previously described. If the T-handle 34 is released after it has been pulled away from the panel 42, the force of the spring 24 of the mechanism 11 on the cable 12 will force the cylinder 29 towards its original position in the tubular support 38. This movement of the cylinder 29 causes the springs 52 to force the collet 45 against the abutment ring 40 and the spring 55 forces the cylindrical extension 35 against the abutment ring 40. The balls 49 return to their original position (shown in Fig. 1) and the cylinder 29, no longer gripped by the jaws of the collet 45, is again free to float inside the cylindrical member 33 to take up strains induced by flexure or temperature variations.

What I claim as my invention is:

1. In combination, a movable elongated member including a cable, a mechanism to which the cable is connected and operable by longitudinal movement of the member in one direction, the member having an end provided with an annular flange, a supporting tube into which the member extends, the tube having an end provided with an internal abutment, the member being movable in said direction along the axis of the tube, and a gripping device for pulling the member along the axis in said direction, comprising a collet surrounding the member and having jaws separated by longitudinal splits extending for a portion of its length, the jaws of the collet being deflectable to grip the member, first coil spring means between the collet and the annular flange of the member normally holding the collet in a position against the abutment where its jaws are not deflected to grip the member, the first coil spring means also urging the member in said direction to hold the cable in tension, each jaw of the collet having a groove extending generally in said direction but inclined to it, the collet having an external annular flange, actuating means comprising a tubular actuator surrounding the collet and surrounded by the supporting tube, the actuator having a handle at one end and an internal collar at the opposite end, the actuator being movable in said direction when the handle is pulled in said direction and having grooves inclined to said direction so as to be approximately parallel to the grooves in the jaws, the grooves in the actuator being equal in number to and adjacent to the grooves in the jaws, and a plurality of balls each of which is movable by the actuator along a groove in a jaw and an adjacent groove in the actuator thus deflecting the jaws of the collet to grip the member and pulling the collet and the member with the actuator in said direction, and second coil spring means between the annular flange of the collet and the collar of the actuator, the second coil spring means opposing movement of the actuator in said direction when the handle is pulled in said direction and urging the actuator against the internal abutment of the supporting tube.

2. The combination claimed in claim 1 wherein said mechanism includes spring means opposing movement of the member in said direction.

3. In combination, a movable member including a table, a mechanism to which the cable is connected and operable by longitudinal movement of the member in one direction, a supporting tube having an end into which the member extends in said direction, the tube having abutment means adjacent said end of the tube, a gripping device within the tube for pulling the member and cable longitudinally in said direction to operate the mechanism, the gripping device comprising a movable actuator and a body having a jaw adapted to grip the member, and spring means in the tube urging the actuator and body against the abutment means where the jaw is out of gripping relation with the member, the spring means also urging the member in said direction towards the other end of the tube to hold the cable in tension, the actuator and jaw having wedging means which, when the actuator is moved away from the abutment means in said direction, move the jaw into gripping relation with the member and force the body to move with the actuator thus pulling the cable in said direction and operating said mechanism.

4. The combination claimed in claim 3, wherein the spring means comprise coil springs coaxial with the tube and in compression between the member and body and between the body and actuator.

5. The combination claimed in claim 4, wherein the wedging means comprise a groove in the actuator extending generally in said direction but inclined to it, a groove in the jaw also inclined to said direction so as to be approximately parallel to the groove in the jaw, and a ball movable along the grooves by the actuator when the actuator is moved in said direction.

6. In combination, a movable member including a table, a mechanism to which the cable is connected and operable by longitudinal movement of the member in one direction, a gripping device for pulling the member and cable longitudinally in said direction to operate said mechanism, the gripping device comprising a movable actuator and a body having a jaw adapted to grip the member, and means for supporting the movable member and gripping device, the supporting means comprising abutment means, and spring means urging the actuator and body in a direction opposite to said direction against the abutment means where the jaw is out of gripping relation with the member, and spring means also urging the member in the first mentioned direction to hold the cable in tension, the actuator and jaw having wedging means which, when the actuator is moved away from the abutment means in the first mentioned direction, move the jaw into gripping relation with the member and force the body to move with the actuator thus pulling the cable in the first mentioned direction and operating said mechanism.

(References on following page)

References Cited in the file of this patent

UNITED STATES PATENTS

| | | | |
|---|---|---|---|
| 50,896 | Bowden | | Nov. 14, 1865 |
| 450,502 | Bristol | | Apr. 14, 1891 |
| 730,460 | Irvine et al. | | June 9, 1903 |
| 790,331 | Terry | | May 23, 1905 |
| 1,103,839 | Rellay | | July 14, 1914 |
| 2,329,932 | Nelson | | Sept. 21, 1943 |
| 2,347,922 | Nelson | | May 2, 1944 |
| 2,616,139 | Von Wald et al. | | Nov. 4, 1952 |
| 2,716,252 | Mackie et al. | | Aug. 30, 1955 |
| 2,814,210 | Ford | | Nov. 26, 1957 |

FOREIGN PATENTS

| | | | |
|---|---|---|---|
| 8,492 | Sweden | | Feb. 2, 1897 |
| 590,962 | Great Britain | | Aug. 1, 1947 |